(12) United States Patent
Salter et al.

(10) Patent No.: US 11,614,513 B2
(45) Date of Patent: Mar. 28, 2023

(54) BATTERY-POWERED VEHICLE SENSORS

(71) Applicant: Ford Global Technologies, LLC, Dearborn, MI (US)

(72) Inventors: Stuart C. Salter, White Lake, MI (US); John Robert Van Wiemeersch, Novi, MI (US); Donald Paul Bilger, Livonia, MI (US); Tarik Safir, Chesterfield (GB); Sam Harris, Billericay (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 100 days.

(21) Appl. No.: 17/199,805

(22) Filed: Mar. 12, 2021

(65) Prior Publication Data

US 2022/0291334 A1  Sep. 15, 2022

(51) Int. Cl.
| | |
|---|---|
| *G01S 7/295* | (2006.01) |
| *G01S 13/60* | (2006.01) |
| *G01S 13/87* | (2006.01) |
| *G01S 13/86* | (2006.01) |
| *G01S 13/04* | (2006.01) |
| *B60Q 1/44* | (2006.01) |
| *G01S 7/00* | (2006.01) |

(52) U.S. Cl.
CPC ............. *G01S 7/295* (2013.01); *B60Q 1/44* (2013.01); *G01S 7/003* (2013.01); *G01S 13/04* (2013.01); *G01S 13/60* (2013.01); *G01S 13/867* (2013.01); *G01S 13/874* (2013.01)

(58) Field of Classification Search
CPC .......... G01S 7/295; G01S 7/003; G01S 13/04; G01S 13/60; G01S 13/867; G01S 13/874; B60Q 1/44
See application file for complete search history.

(56) References Cited

U.S. PATENT DOCUMENTS

| | | |
|---|---|---|
| 5,563,576 A | 10/1996 | Drori et al. |
| 7,417,585 B2 | 8/2008 | Yamagami et al. |
| 8,768,549 B2 | 7/2014 | Erko et al. |
| 9,266,443 B2 | 2/2016 | Payne et al. |
| 9,394,059 B2 | 7/2016 | Cox et al. |

(Continued)

FOREIGN PATENT DOCUMENTS

| | | | |
|---|---|---|---|
| DE | 102015118874 A1 | * | 5/2017 |
| WO | 2009094367 A1 | | 7/2009 |

(Continued)

OTHER PUBLICATIONS

DE_102015118874_A1_I.pdf is a translation of DE_102015118874_A1_I (Year: 2017).*

*Primary Examiner* — Erin F Heard
*Assistant Examiner* — Kenneth W Good
(74) *Attorney, Agent, or Firm* — Frank Lollo; Bejin Bieneman PLC

(57) ABSTRACT

A computer includes a processor and a memory storing instructions executable by the processor to receive radar data from a radar sensor of a vehicle; demarcate a zone of coverage of the radar sensor, the zone of coverage having an area based on a number of objects indicated by the radar data; and after demarcating the zone of coverage, in response to detecting a newly present object in the zone of coverage, adjust a scanning rate of the radar sensor based on a distance of the newly present object from the radar sensor.

18 Claims, 8 Drawing Sheets

(56) References Cited

U.S. PATENT DOCUMENTS

| | | | |
|---|---|---|---|
| 9,412,268 B2 | 8/2016 | Saptharishi et al. | |
| 9,784,229 B2 | 10/2017 | Holub et al. | |
| 9,880,278 B2 | 1/2018 | van Uffelen et al. | |
| 10,600,257 B2 | 3/2020 | Jiang et al. | |
| 10,850,709 B1 | 12/2020 | Nagata et al. | |
| 11,104,270 B1 * | 8/2021 | Timms | B60Q 1/44 |
| 2005/0073433 A1 * | 4/2005 | Gunderson | G01S 13/931 |
| | | | 340/903 |
| 2005/0193212 A1 | 9/2005 | Yuhara | |
| 2016/0356594 A1 * | 12/2016 | Sorenson | G08G 1/161 |
| 2017/0160392 A1 * | 6/2017 | Brisimitzakis | G01S 7/062 |
| 2019/0102963 A1 | 4/2019 | Owens et al. | |
| 2019/0228647 A1 * | 7/2019 | Conde | G08G 1/0141 |
| 2019/0391250 A1 * | 12/2019 | Cohen | G01S 13/87 |
| 2020/0031312 A1 * | 1/2020 | Schat | G01S 13/605 |
| 2020/0209377 A1 * | 7/2020 | Ogura | G01S 13/04 |
| 2020/0408876 A1 * | 12/2020 | Weber | G01S 7/352 |
| 2021/0026019 A1 * | 1/2021 | Gahagan | G01S 17/89 |
| 2021/0349204 A1 * | 11/2021 | Brodsky | G08G 1/054 |

FOREIGN PATENT DOCUMENTS

| | | | | |
|---|---|---|---|---|
| WO | WO-2019013948 A1 * | 1/2019 | | |
| WO | WO-2021003440 A1 * | 1/2021 | | B60W 60/001 |

* cited by examiner

BATTERY-POWERED VEHICLE SENSORS

BACKGROUND

Center high-mounted stop lamps (CHMSL) are brake lamps positioned above a rear window of a vehicle and centered laterally on the vehicle. CHMSLs have been required by United States regulations for new cars and light trucks since the 1990s. The purpose of the CHMSL is to provide better visibility to other vehicles, which may not have a good view of the left and right brake lamps of the vehicle.

DETAILED DESCRIPTION

Figure 1:
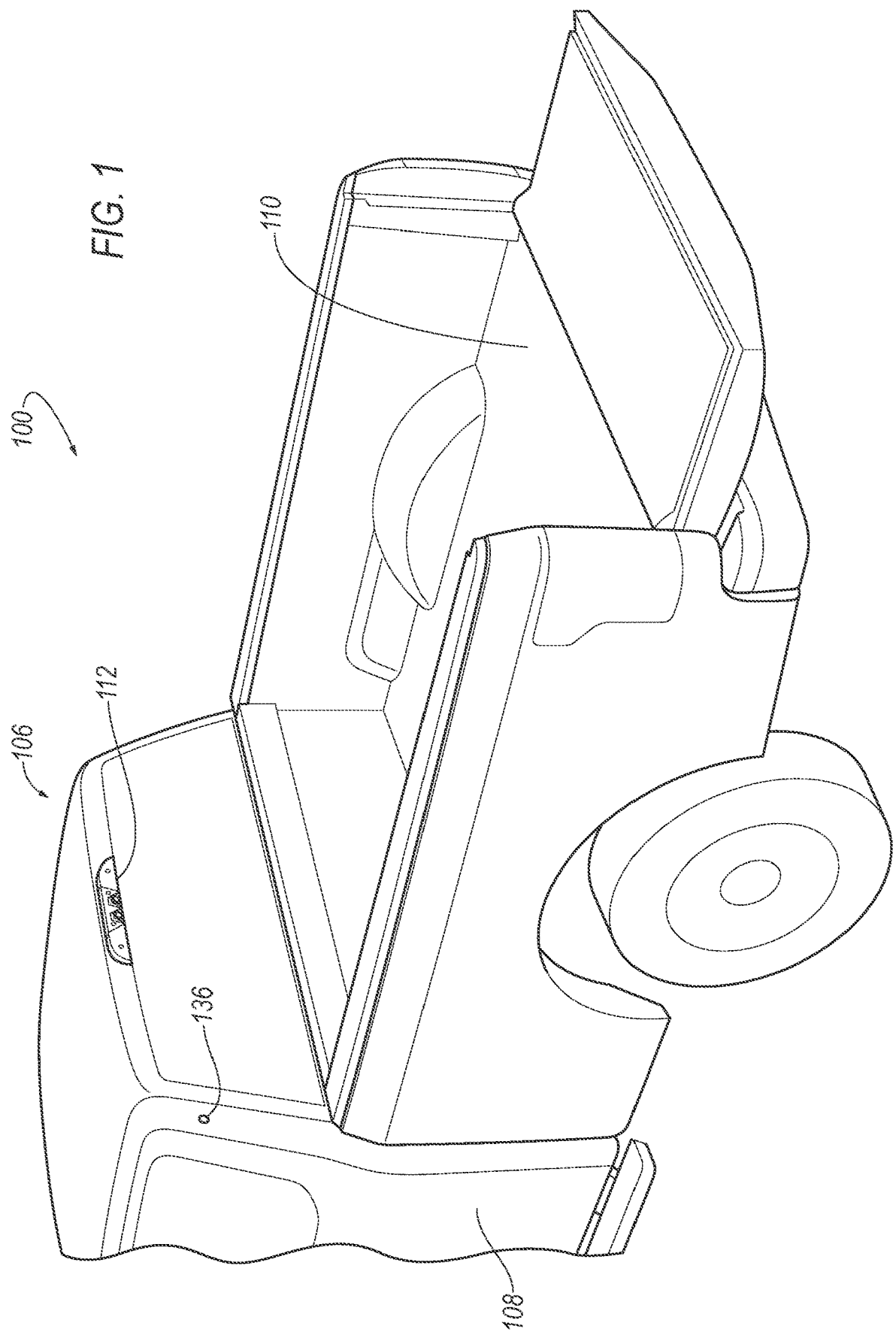
FIG. 1 is a rear perspective view of an example vehicle.

A computer includes a processor and a memory storing instructions executable by the processor to receive radar data from a radar sensor of a vehicle; demarcate a zone of coverage of the radar sensor, the zone of coverage having an area based on a number of objects indicated by the radar data; and after demarcating the zone of coverage, in response to detecting a newly present object in the zone of coverage, adjust a scanning rate of the radar sensor based on a distance of the newly present object from the radar sensor.

The area of the zone of coverage may have an inverse relationship with the number of objects indicated by the radar data.

The scanning rate may have an inverse relationship with the distance.

The zone of coverage may be a first zone of coverage, the radar sensor may have a second zone of coverage, and the instructions may further include instructions to, in response to receiving data from the radar sensor indicating that the newly present object is in the second zone of coverage, turn on a camera. The camera may have a higher power draw than the radar sensor.

The instructions may further include instructions to, after turning on the camera, record image data from the camera. The instructions may further include instructions to, upon determining that a previously present object is being removed from within the second zone of coverage based on the image data from the camera, store the image data. The instructions may further include instructions to, upon failing to determine that the previously present object is being removed from within the second zone of coverage, overwrite the image data with newer image data from the camera.

The instructions may further include instructions to, upon determining that the previously present object is being removed from within the second zone of coverage based on the image data from the camera, transmit a message including the stored image data to a remote computing device.

The instructions may include instructions to, in response to receiving the data from the radar sensor indicating that the newly present object is in the second zone of coverage, transmit a message instructing at least one vehicle system to wake up.

The instructions may further include instructions to, in response to receiving data from the radar sensor indicating that the newly present object is moving at a speed greater than a threshold speed, refrain from turning on the camera.

The instructions may further include instructions to, in response to receiving data from the radar sensor indicating that the newly present object is in the first zone of coverage and outside the second zone of coverage, refrain from turning on the camera.

The instructions may further include instructions to, in response to the number of objects indicated by the radar data being greater than a threshold number, demarcate the first zone of coverage coextensive with the second zone of coverage.

The instructions may further include instructions to, after demarcating the zone of coverage, upon determining that the newly present object is a recognized person, maintain the scanning rate of the radar sensor at a default scanning rate.

The instructions may further include instructions to, in response to receiving data from the radar sensor indicating a lack of previously present objects in a region, prevent the radar sensor from running.

The radar sensor may be a first radar sensor, and the instructions may further include instructions to receive radar data from a second radar sensor, demarcate a zone of coverage of the second radar sensor, the zone of coverage of the second radar sensor having an area based on a number of objects indicated by the radar data from the second radar, the zone of coverage of the second radar sensor being different than the zone of coverage of the first radar sensor. The instructions may further include instructions to, after demarcating the zone of coverage of the second radar sensor, in response to detecting a newly present object in the zone of coverage of the second radar sensor, adjust a scanning rate of the second radar sensor based on a distance of the newly present object from the second radar sensor, and the scanning rate of the second radar sensor may be adjusted independently of the scanning rate of the first radar sensor. The instructions may further include instructions to, before adjusting the scanning rate of the radar sensor, put a wired vehicle network to which the radar sensor is connected in a low-power state.

A method includes receiving radar data from a radar sensor of a vehicle; demarcating a zone of coverage of the radar sensor, the zone of coverage having an area based on a number of objects indicated by the radar data; and after demarcating the zone of coverage, in response to detecting a newly present object in the zone of coverage, adjusting a scanning rate of the radar sensor based on a distance of the newly present object from the radar sensor.

The zone of coverage may be a first zone of coverage, the radar sensor may have a second zone of coverage, and the method may further include, in response to receiving data from the radar sensor indicating that the newly present object is in the second zone of coverage, turning on a camera.

With reference to the Figures, wherein like numerals indicate like parts throughout the several views, a computer 120, 132, 138 includes a processor and a memory storing instructions executable by the processor to receive radar data from a first radar sensor 102 of a vehicle 100; demarcate a first zone of coverage Z1 of the first radar sensor 102, the first zone of coverage Z1 having a first area based on a number of objects 104 indicated by the radar data; and after demarcating the first zone of coverage Z1, in response to detecting a newly present object 104 in the first zone of coverage Z1, adjust a scanning rate of the first radar sensor 102 based on a distance of the newly present object 104 from the first radar sensor 102.

A system 106 including the first radar sensor 102 and the computer 120, 132, 138 provides an energy-efficient way to monitor regions in, on, and around the vehicle 100. For example, the computer 120, 132, 138 can demarcate a large first zone of coverage Z1 when the vehicle 100 is in a deserted area, and the first radar sensor 102 can run at a low scanning rate because it will take a long time for an object 104 such as a person to move from outside the first zone of coverage Z1 to the vehicle 100. If an object 104 does move into the first zone of coverage Z1, the computer 120, 132, 138 can dynamically adjust the scanning rate, e.g., increasing the scanning rate as the object 104 gets closer. In a crowded area, the computer 120, 132, 138 can demarcate a small first zone of coverage Z1 compensated with a high scanning rate. Thus, the first radar sensor 102 can have its scanning rate adjusted to run less frequently in situations in which more frequent scanning is less important, saving energy. The energy savings are especially important for when the vehicle 100 is powered off and the first radar sensor 102 is relying on a finite supply of stored energy.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc.

The vehicle 100 may include a body 108. The vehicle 100 may be of a unibody construction, in which a frame and the body 108 of the vehicle 100 are a single component. The vehicle 100 may, alternatively, be of a body-on-frame construction, in which the frame supports the body 108 that is a separate component from the frame. The frame and body 108 may be formed of any suitable material, for example, steel, aluminum, etc.

The body 108 of the vehicle 100 includes a storage area 110, i.e., an area to place cargo to be transported by the vehicle 100. The storage area 110 can be exposed, such as a pickup-truck bed, as shown in FIG. 1. The storage area 110 can instead include a covering, such as a trunk with a trunk lid.

Figure 2:
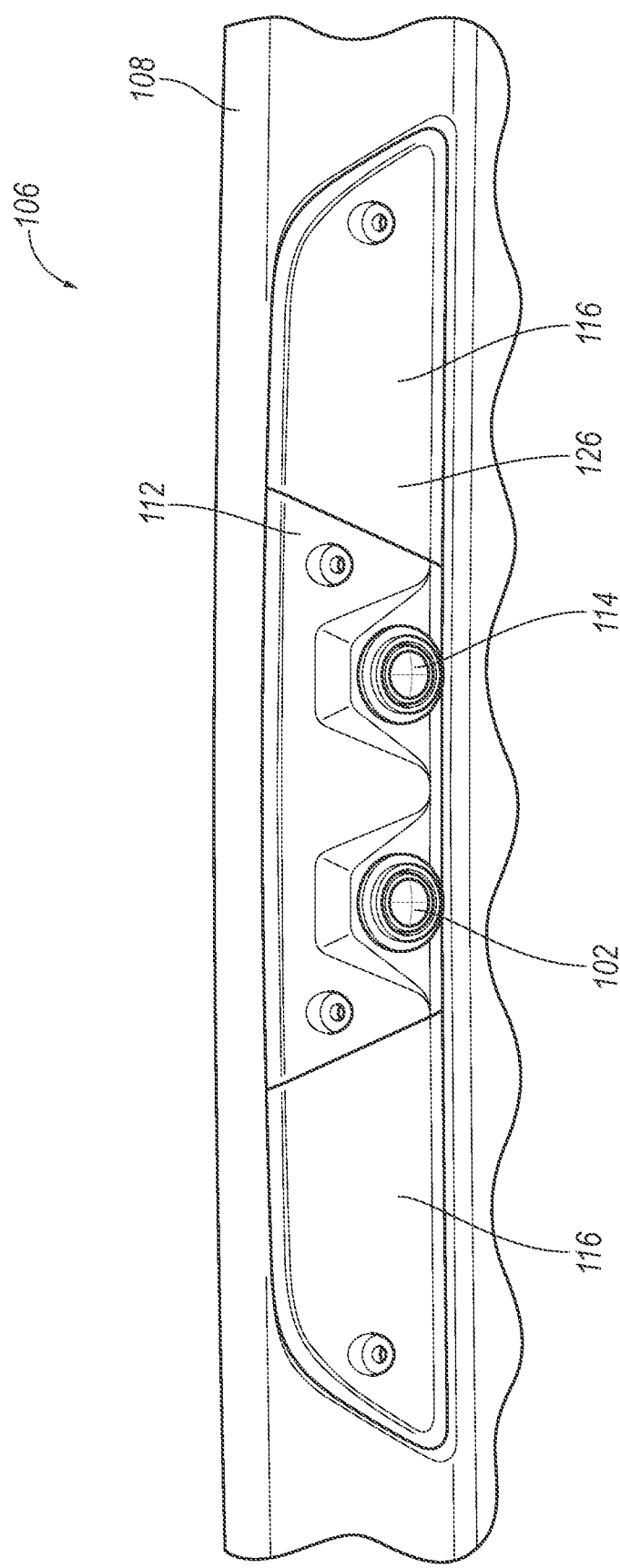
FIG. 2 is a plan view of a center high-mounted stop lamp (CHMSL) unit of the vehicle.
Figure 3:
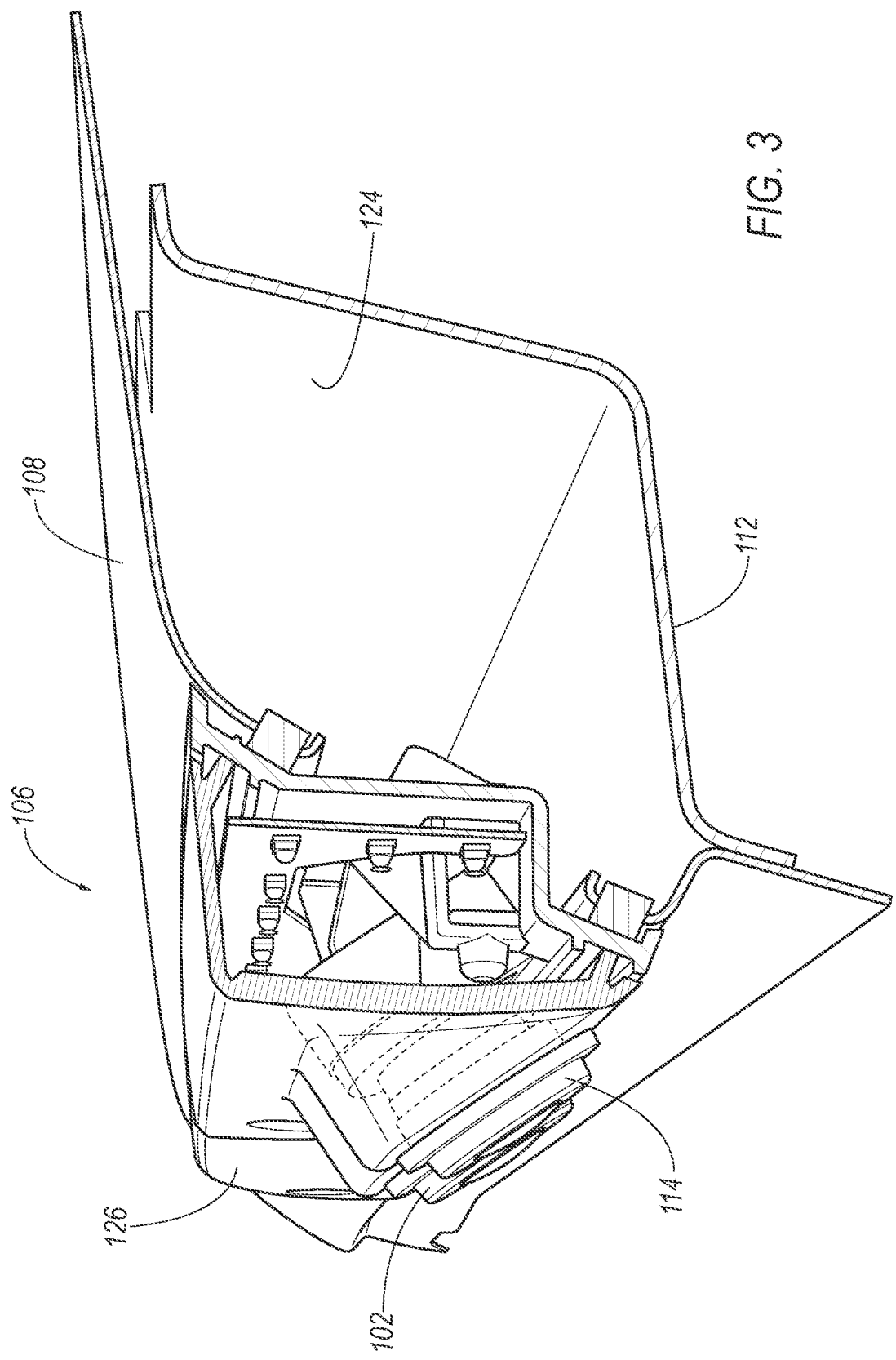
FIG. 3 is a perspective cutaway view of the CHMSL unit.
Figure 4:
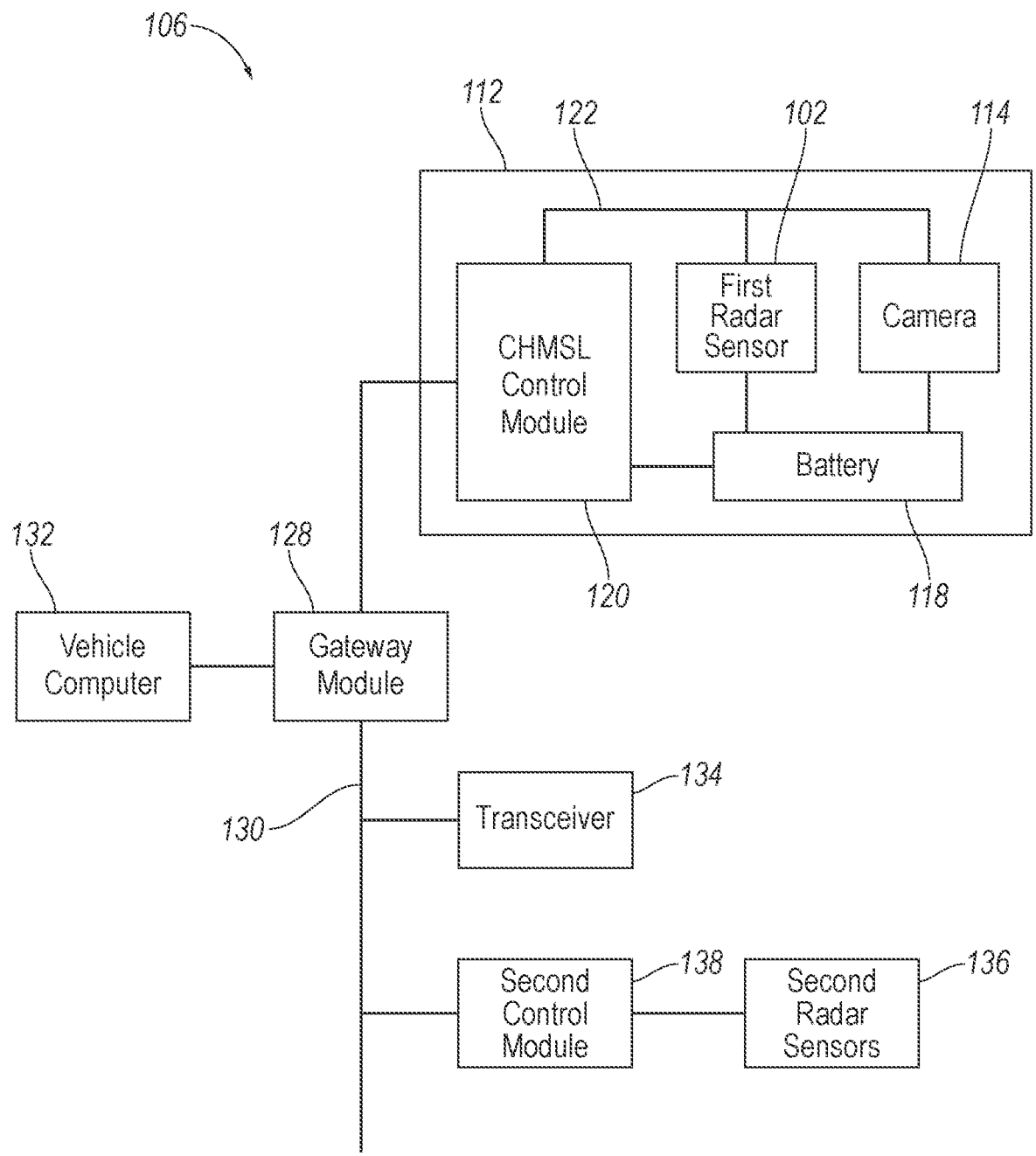
FIG. 4 is a block diagram of the CHMSL unit in the vehicle.

With reference to FIGS. 2 and 3, the vehicle 100 includes a center high-mounted stop lamp (CHMSL) housing 112. The CHMSL housing 112 contains the first radar sensor 102, a camera 114, at least one lamp 116, a battery 118, a CHMSL control module 120, and a vehicle network such as local interconnect network (LIN) 122, as shown in FIG. 4. The CHMSL housing 112 can include an internal panel 124 and a lamp panel 126. The internal panel 124 can be concealed inside the body 108 of the vehicle 100. The lamp panel 126 can be exposed on the body 108 of the vehicle 100. Some or all of the lamp panel 126 is transparent, and some or all of the transparent portion of the lamp panel 126 is colored, e.g., red to indicate braking. The lamp panel 126 covers the lamps 116, which can be illuminated to indicate the vehicle 100 is braking and/or shifted into reverse.

The lamps 116 are positioned inside the CHMSL housing 112. The lamps 116 may be any lighting system suitable for easy visibility by other vehicles operating near the vehicle 100, e.g., tungsten, halogen, high-intensity discharge (HID) such as xenon, light-emitting diode (LED), laser, etc.

The first radar sensor 102 is suitable for detecting objects 104, e.g., in or near the storage area 110. A radar sensor as is known uses radio waves to determine the relative location, angle, and/or velocity of an object 104 by tracking the time required for the radio waves generated by the radar to reflect back to the radar. The first radar sensor 102 runs at a scanning rate, which is an occurrence interval of generating and transmitting the radio waves, e.g., twice per second, four times per second, etc. The power draw, i.e., the rate of power consumption, of the first radar sensor 102 depends on the scanning rate, i.e., typically is higher for higher scanning rates.

The first radar sensor 102 can be arranged in the CHMSL housing 112 so that a field of view of the first radar sensor 102 encompasses the storage area 110 of the vehicle 100 when the CHMSL housing 112 is installed. For example, the first radar sensor 102 can be bolted into a fixed position relative to the CHMSL housing 112, e.g., angled to face rearward and downward.

The camera 114 is any optical sensor or camera suitable for providing detailed data about a surrounding area, e.g., the storage area 110 and objects 104 in or near the storage area 110 or behind the vehicle 100. The camera 114 as is known detects electromagnetic radiation in some range of wavelengths. For example, the camera 114 may detect visible light, infrared radiation, ultraviolet light, or some range of wavelengths including visible, infrared, and/or ultraviolet light. The power draw of the camera 114 is higher than the power draw of the first radar sensor 102, for any scanning rate of the first radar sensor 102.

The camera 114 can be arranged in the CHMSL housing 112 so that a field of view of the camera 114 encompasses the storage area 110 when the CHMSL housing 112 is installed. For example, the camera 114 can be bolted into a fixed position relative to the CHMSL housing 112, e.g., angled to face rearward and downward in illustrated examples.

With reference to FIG. 4, the battery 118 is disposed in the CHMSL housing 112. The battery 118 is electrically coupled to the first radar sensor 102, the camera 114, and the CHMSL control module 120. The battery 118 can be any type suitable for powering the first radar sensor 102, the camera 114, and the CHMSL control module 120 while the vehicle 100 is off, e.g., a lithium-ion battery, a nickel-metal hydride battery, a lead-acid battery, an ultracapacitor, etc.

The CHMSL control module 120 is a microprocessor-based computing device, e.g., a generic computing device including a processor and a memory, an electronic controller or the like, a field-programmable gate array (FPGA), an application-specific integrated circuit (ASIC), etc. The CHMSL control module 120 can thus include a processor, a memory, etc. The memory of the CHMSL control module 120 can include media for storing instructions executable by the processor as well as for electronically storing data and/or databases, and/or the CHMSL control module 120 can include structures such as the foregoing by which programming is provided.

The LIN 122 is a wired vehicle network that communicatively couples the CHMSL control module 120 to the first radar sensor 102, the camera 114, the battery 118, and a gateway module 128. The LIN 122 is a network employing a serial network protocol, specifically the local interconnect network standard. Alternatively, the CHMSL control module 120 can be directly communicatively coupled to a controller area network (CAN) bus 130 of the vehicle 100.

The vehicle 100 includes the gateway module 128. The gateway module 128 is a control module that connects and transmits data between buses of different domains in the vehicle 100, e.g., the LIN 122, the CAN bus 130, Ethernet, other LINs, OBD-II, etc.

The vehicle 100 includes the CAN bus 130. The CAN bus 130 is a wired vehicle network that communicatively couples the gateway module 128, a vehicle computer 132, a transceiver 134, second radar sensors 136 via second control modules 138, and other components. The vehicle computer 132 is communicatively coupled to the first radar sensor 102 and the camera 114 via the CAN bus 130 and the LIN 122. The CAN bus 130 is a network using a vehicle bus CAN standard, which is a message-based protocol employing multiplexing.

The vehicle computer 132 is a microprocessor-based computing device, e.g., a generic computing device including a processor and a memory, an electronic controller or the like, a field-programmable gate array (FPGA), an application-specific integrated circuit (ASIC), etc. The vehicle computer 132 can thus include a processor, a memory, etc. The memory of the vehicle computer 132 can include media for storing instructions executable by the processor as well as for electronically storing data and/or databases, and/or the vehicle computer 132 can include structures such as the foregoing by which programming is provided. The vehicle computer 132 can be multiple computers, e.g., control modules, coupled together.

The transceiver 134 may be adapted to transmit signals wirelessly through any suitable wireless communication protocol, such as Bluetooth®, WiFi, IEEE 802.11a/b/g, Ultra-Wideband (UWB) or other RF (radio frequency) communications, etc. The transceiver 134 may be adapted to communicate with a remote computing device, that is, a computing device distinct and physically spaced from the vehicle 100. The remote computing device may be located outside the vehicle 100. For example, the remote computing device may be associated with another vehicle (e.g., V2V communications), an infrastructure component (e.g., V2I communications via Dedicated Short-Range Communications (DSRC) or the like), an emergency responder, a mobile device associated with the owner of the vehicle 100, etc. The transceiver 134 may be one device or may include a separate transmitter and receiver.

The second radar sensors 136 are suitable for detecting objects 104, e.g., near the vehicle 100. The second radar sensors 136 each run at a scanning rate, which is a frequency of generating and transmitting the radio waves, e.g., twice per second, four times per second, etc. The power draw, i.e., the rate of power consumption, of each second radar sensor 136 depends on the scanning rate, i.e., typically is higher for higher scanning rates. The second radar sensors 136 can be connected to and powered by batteries (not shown) such as the vehicle battery when the vehicle 100 is off, and the second radar sensors 136 can be controlled by respective second control modules 138 when the vehicle 100 is off. The second control modules 138 can have the same structure as the CHMSL control module 120.

Figure 5:
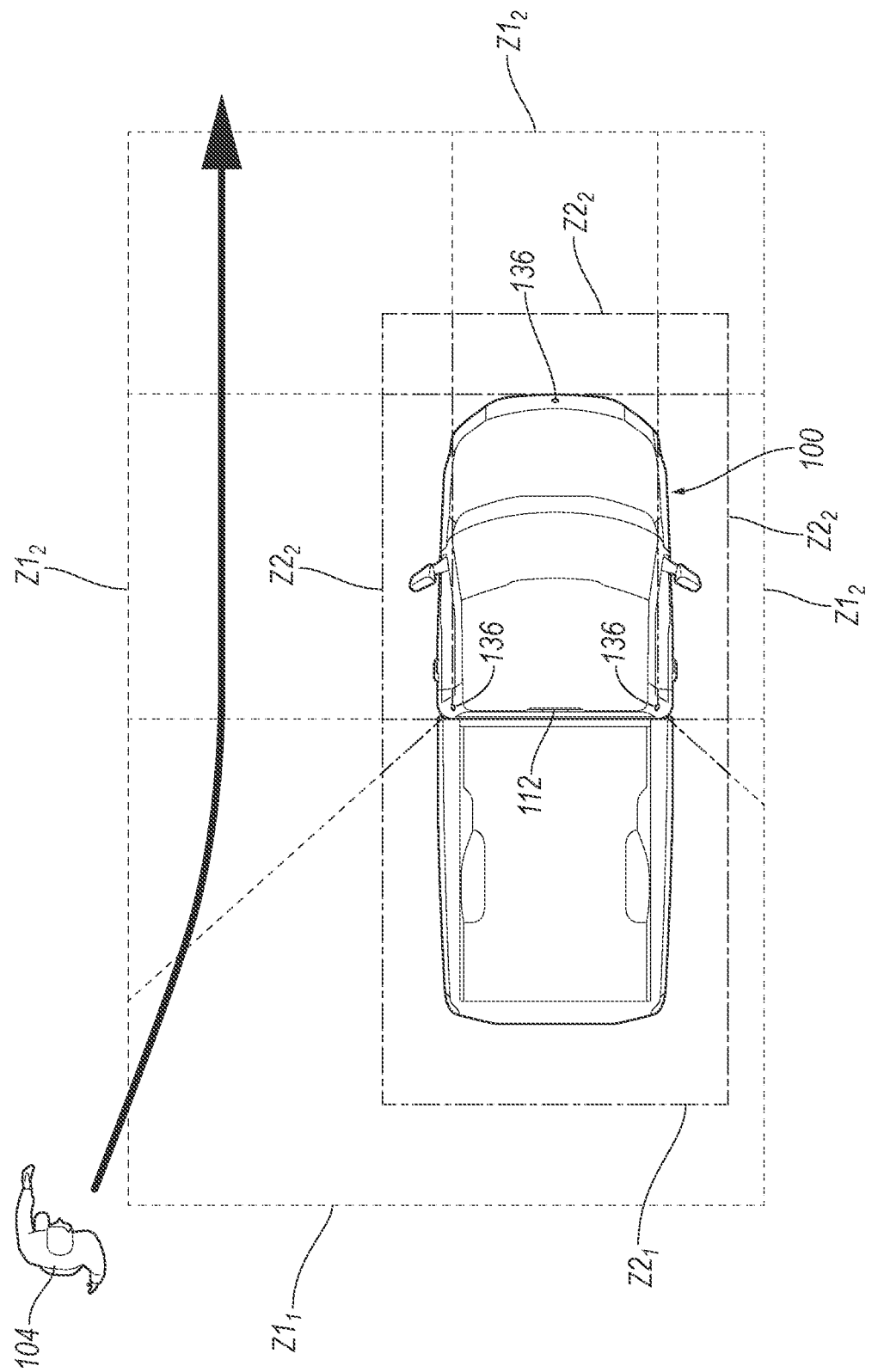
FIG. 5 is a top view of example zones of coverage around the vehicle.
Figure 6:
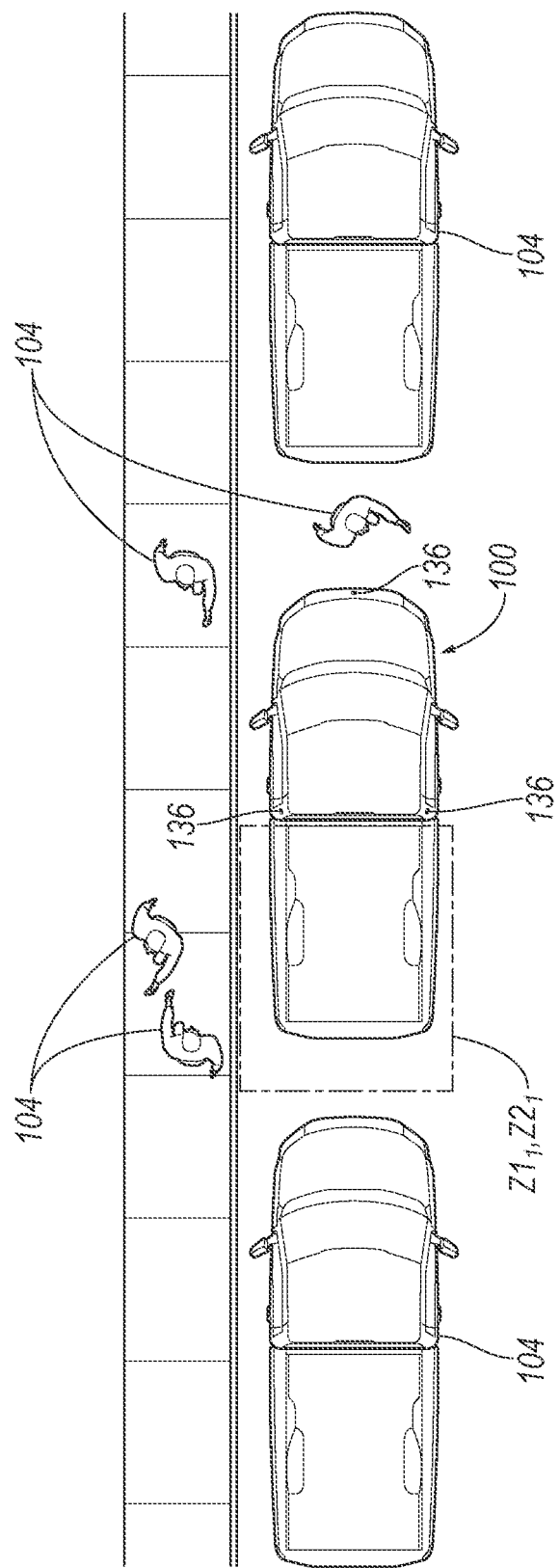
FIG. 6 is another top view of example zones of coverage around the vehicle.

Returning to FIG. 1, the second radar sensors 136 are mounted to and fixed relative to the body 108 of the vehicle 100, e.g., a B pillar of the vehicle 100. For example, the vehicle 100 can have three second radar sensors 136, one for each B pillar and one on a front end of the vehicle 100, as shown in FIGS. 5 and 6. The second radar sensors 136 in the illustrated example are arranged to have fields of view in different directions than the first radar sensor 102 and the camera 114, e.g., lateral and forward directions relative to the vehicle 100.

With reference to FIGS. 5 and 6, the radar sensors 102, 136 can have zones of coverage $Zi_j$, in which i is an index of the zone of coverage for the radar sensor 102, 136 and j is an index of the radar sensor 102, 136, e.g., the first radar sensor 102 has the first zone of coverage $Z1_1$ and a second zone of coverage $Z2_1$, and each second radar sensor 136 has a first zone of coverage $Z1_2$ and a second zone of coverage $Z2_2$. For the purposes of this disclosure, a "zone of coverage" is defined as a region of the environment around the vehicle 100 that is within a field of view of a sensor and delimits where sensor data from the sensor can trigger action by the vehicle 100. The zones of coverage $Zi_j$ can vary in extent, e.g., between what is shown in FIG. 5 and what is shown in FIG. 6, and a process 700 below describes how the computer 120, 132, 138 (i.e., the vehicle computer 132, the CHMSL control module 120, and/or the second control modules 138 of the second radar sensors 136) chooses the extent of the zones of coverage $Zi_j$. The zones of coverage $Zi_2$ of the second radar sensors 136 are different than the zones of coverage $Zi_1$ of the first radar sensor 102. Different actions can be taken when objects 104 are detected in one of the second zones of coverage $Z2_j$ than in the respective first zone of coverage $Z1_j$ and outside that second zone of coverage $Z2_j$. The second zone of coverage $Z2_1$ of the first radar sensor 102 is completely inside the first zone of coverage $Z1_1$, and the first zone of coverage $Z1_1$ can vary from significantly larger than the second zone of coverage $Z2_1$, as in FIG. 5, to coextensive with the second zone of coverage $Z2_1$, as in FIG. 6. The second zone of coverage $Z2_1$ of the first radar sensor 102 may be constant in extent. The second zones of coverage $Z2_2$ of the second radar sensors 136 are completely inside the respective first zones of coverage $Z1_2$. The zones of coverage $Zi_2$ can vary from extensive in size to nonexistent.

FIG. 5 shows a first example of the zones of coverage $Zi_j$. The computer 120, 132, 138 may choose these zones of coverage $Zi_j$ when the environment around the vehicle 100 is relatively deserted, as described below with respect to the process 700. The first radar sensor 102 has the first zone of coverage $Z1_1$ covering the storage area 110 and regions behind and beside the vehicle 100. The first radar sensor 102 also has the second zone of coverage $Z2_1$ covering the storage area 110 and a region within arm's reach of the storage area 110. The second radar sensors 136 have first and second zones of coverage $Zi_2$ beside and in front of the vehicle 100. The first zones of coverage $Z1_j$ can extend comparatively far distances from the vehicle 100, e.g., 50 feet. The large first zones of coverage $Z1_j$ permit the radar sensors 102, 136 to be run at low scanning rates and still be able to detect objects 104 before reaching the storage area 110 from outside the first zones of coverage $Z1_j$.

FIG. 6 shows a second example of the zones of coverage $Zi_j$. The computer 120, 132, 138 may choose these zones of coverage $Zi_j$ when the environment around the vehicle 100 is relatively crowded, as described below with respect to the process 700. The second zone of coverage $Z2_1$ of the first radar sensor 102 can be the same as in the example of FIG. 5, and the first zone of coverage $Z1_1$ of the first radar sensor 102 can be smaller, e.g., coextensive with the second zone of coverage $Z2_1$. The zones of coverage $Zi_2$ of the second radar sensors 136 are made smaller, e.g., nonexistent, e.g., by turning off the second radar sensors 136. The smaller zones of coverage $Zi_j$ avoid frequent triggering by the objects 104 in the vicinity of the vehicle 100, and the first radar sensor 102 can be run at a higher scanning rate to compensate the level of protection of the storage area 110.

Figure 7A:
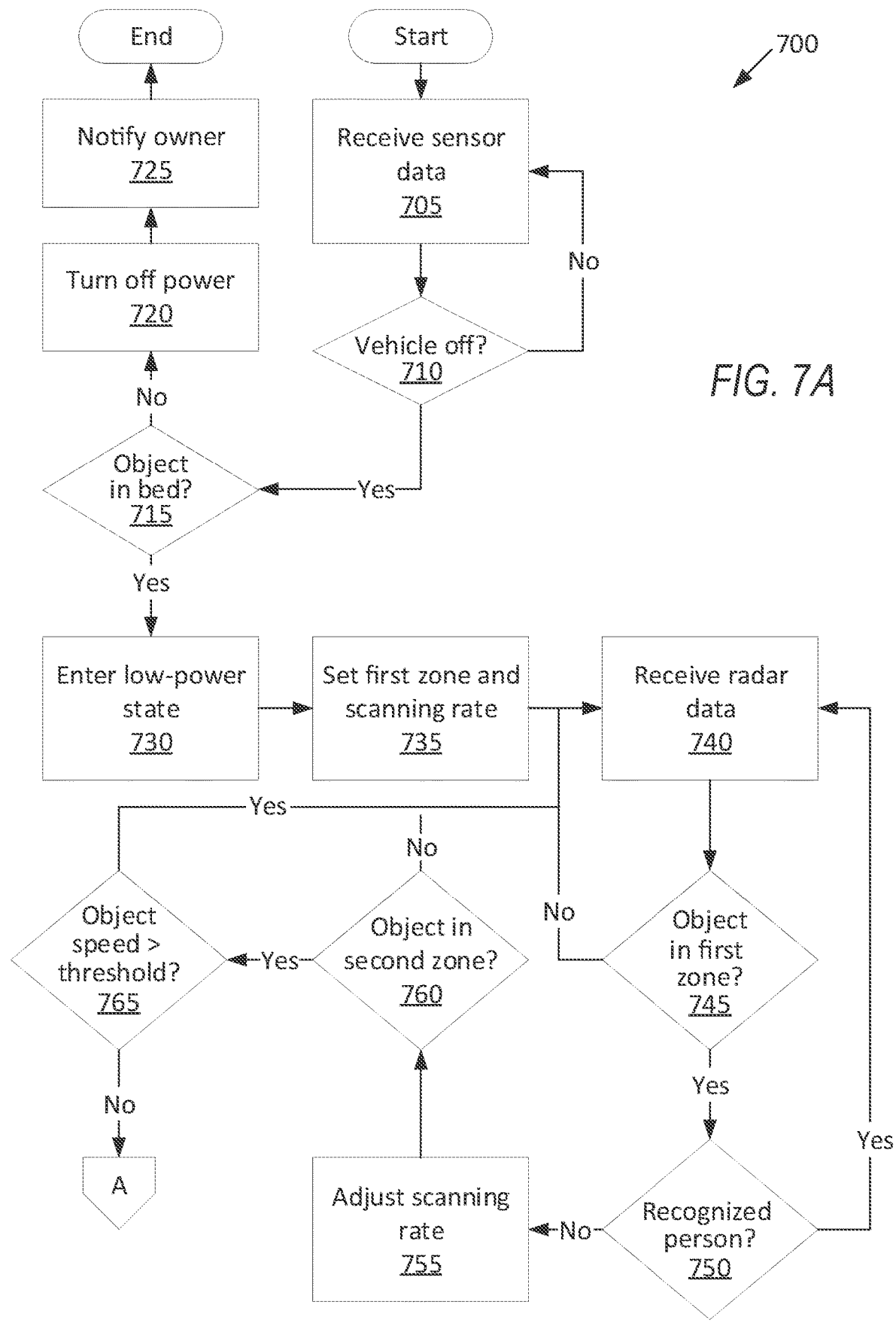
FIGS. 7A and 7B are collectively a process flow diagram of an example process for demarcating the zones of coverage and detecting objects in the zones of coverage.
Figure 7B:
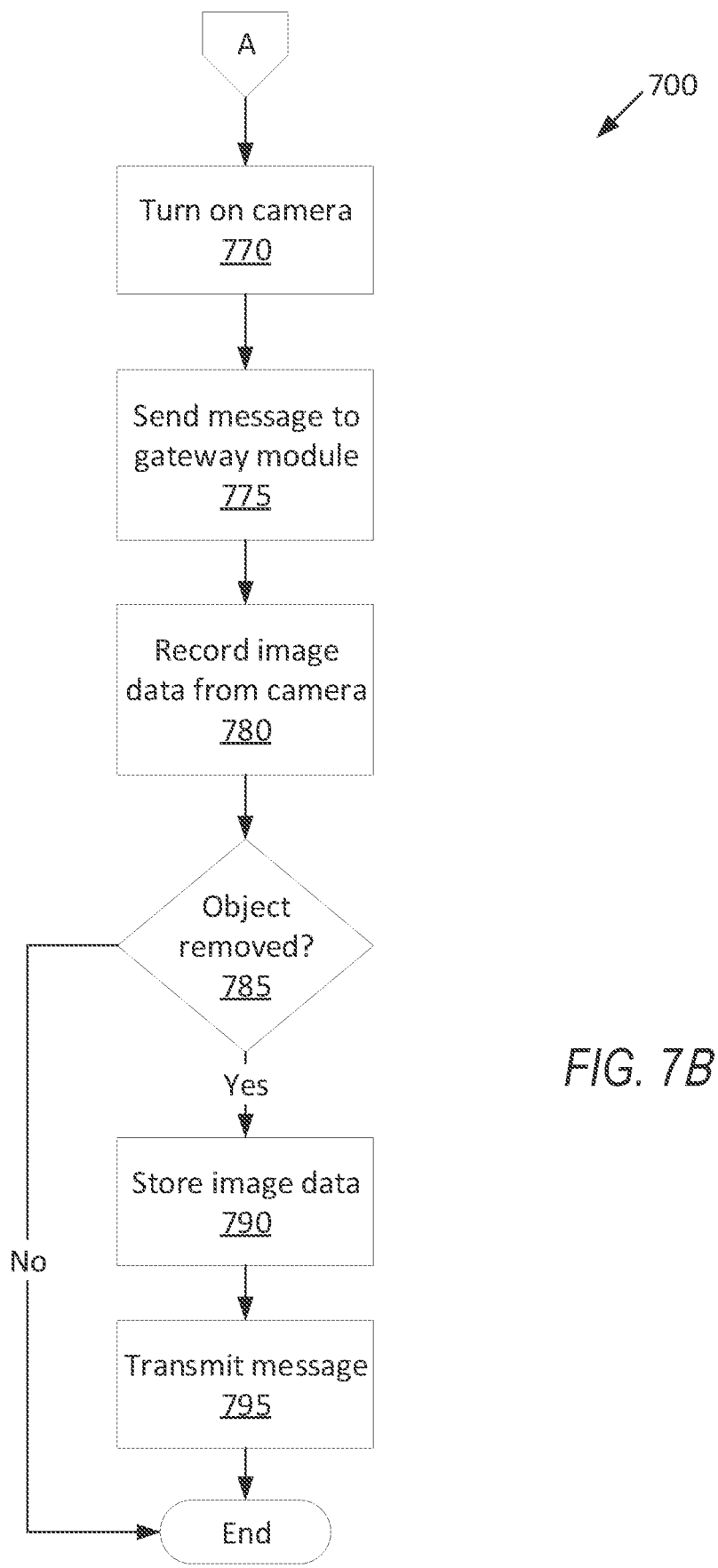

FIGS. 7A-B are collectively a process flow diagram illustrating an exemplary process 700 for demarcating the zones of coverage $Zi_j$ and detecting objects 104 in the zones of coverage $Zi_j$. The memory of the computer 120, 132, 138 (i.e., the vehicle computer 132, the CHMSL control module 120, and/or the second control modules 138) stores executable instructions for performing the steps of the process 700 and/or programming can be implemented in structures such as mentioned above. As a general overview of the process 700, the vehicle computer 132 receives data from the radar sensors 102, 136. When the vehicle 100 turns off, the vehicle computer 132 determines whether there are any objects 104 in the storage area 110 and, if not, turns off the first radar sensor 102. If there is an object 104 in the storage area 110, then the vehicle computer 132 instructs the CHMSL control module 120 to enter a low-power state. The CHMSL control module 120 uses the data from the first radar sensor 102 to demarcate the first zone of coverage Z1 of the first radar sensor 102 based on the objects 104 detected. The CHMSL control module 120 continues to receive data from the first radar sensor 102. If a newly present object 104 is in the first zone of coverage $Z1_1$ of the first radar sensor 102, the CHMSL control module 120 determines whether the newly present object 104 is a recognized person. If so, the CHMSL control module 120 resumes receiving radar data while maintaining the scanning rates of the radar sensors 102, 136. If not, the CHMSL control module 120 adjusts the scanning rates based on a distance of the newly present object 104 from the first radar sensor 102. If the newly present object 104 is in the second zone of coverage $Z2_1$ of the first radar sensor 102, the CHMSL control module 120 determines whether the speed of the newly present object 104 is greater than a threshold speed. If so, the CHMSL control module 120 resumes receiving radar data. If not, the CHMSL control module 120 turns on the camera 114 and sends a wakeup message to the gateway module 128. Then the vehicle computer 132 records the image data generated by the camera 114 on a loop. If the vehicle computer 132 determines that a previously present object 104 is removed from the storage area 110, the vehicle computer 132 stores the image data and transmits a message to a remote computing device. The same overall process 700 can be performed independently for the second radar sensors 136.

The process 700 begins in a block 705, shown in FIG. 7A, in which the vehicle computer 132 receives data from the radar sensors 102, 136 and possibly the camera 114.

Next, in a decision block 710, the vehicle computer 132 determines whether the vehicle 100 has been turned off. The vehicle computer 132 can check a setting in memory that tracks the state of the vehicle 100. If the vehicle 100 is still on, the process 700 returns to the block 705 to continue monitoring data. If the vehicle 100 has just been turned off, the process 700 proceeds to a decision block 715.

In the decision block 715, the vehicle computer 132 determines whether the data from the first radar sensor 102 indicates a lack of previously present objects 104 in a region, e.g., in the storage area 110, or in the storage area 110 and an area behind the vehicle 100 where a trailer could be present. The vehicle computer 132 may additionally use data from the camera 114 to determine whether objects 104 are present in the region. For example, the vehicle computer 132 can compare the data from first radar sensor 102 and/or the camera 114 with baseline data stored in memory of the region when empty. If greater than a threshold amount of the data from the first radar sensor 102 and/or the camera 114 deviates from the baseline data, then the vehicle computer 132 infers that an object 104 is present in the region. If there are no objects 104 in the region, the process 700 proceeds to a block 720. If an object 104 is in the region, the process 700 proceeds to a block 730.

In the block 720, the vehicle computer 132 prevents the radar sensors 102, 136 from running, e.g., instructs the CHMSL control module 120 to turn off components on the LIN 122, i.e., the CHMSL control module 120, the first radar sensor 102, and the camera 114, and instructs the second control modules 138 to turn off the second radar sensors 136.

Next, in a block 725, the vehicle computer 132 transmits a message via the transceiver 134 to the remote computing device, e.g., to the mobile device of the owner or operator of the vehicle 100. The message can notify the owner or operator that the first radar sensor 102 is not running because the storage area 110 does not contain any objects 104. After the block 725, the process 700 ends.

In the block 730, the vehicle computer 132 instructs the CHMSL control module 120 to put the LIN 122 in a low-power state. Specifically, the CHMSL control module 120 turns off the camera 114, and the CHMSL control module 120 can enter a mode in which the CHMSL control module 120 does not send messages to the gateway module 128 (except as described below with respect to a block 775). Networks including the second radar sensors 136 can also be put into low-power states. The vehicle computer 132 transmits the data received in the block 705 above to the CHMSL control module 120 and the second control modules 138. The vehicle computer 132 can then turn itself off.

Next, in a block 735, the CHMSL control module 120 demarcates the first zone of coverage $Z1_1$ of the first radar sensor 102, and the CHMSL control module 120 sets the scanning rate of the first radar sensor 102. The number of objects 104 can be determined as a number of discrete regions in the radar data having radio waves indicating a shorter distance than the surrounding region of the radar data. The area of the first zone of coverage $Z1_1$ is based on the number of objects 104 indicated by the radar data from the first radar sensor 102. The area is represented in units of distance squared, e.g., $m^2$. For example, the area of the first zone of coverage $Z1_1$ has an inverse relationship with the number of objects 104 indicated by the radar data from the first radar sensor 102, i.e., area decreases as the number increases. The memory of the CHMSL control module 120 can store a lookup table with demarcations of the first zone of coverage $Z1_1$ and scanning rates paired with numbers of objects 104. The scanning rates can be chosen for each demarcation of the first zone of coverage $Z1_1$ based on how long it would typically take for a person to move from an outer extent of the first zone of coverage $Z1_1$ to the storage area 110. The scanning rate decreases as the area of the first zone of coverage $Z1_1$ increases. The demarcations in the lookup table can be chosen by minimizing power consumption of the first radar sensor 102. The power consumption is affected by a baseline scanning rate, i.e., the scanning rate when no objects 104 are in the first zone of coverage $Z1_1$, and by objects 104 entering the first zone of coverage $Z1_1$, which causes the scanning rate to increase as described below with respect to a block 755. For each possible number of objects 104, a demarcation can be chosen for the first zone of coverage $Z1_1$ that minimizes power consumption based on a likely rate of objects 104 entering the first zone of coverage $Z1_1$ with that demarcation. For a threshold number of objects 104 and above, the CHMSL control module 120 can demarcate the first zone of coverage $Z1_1$ of the first radar sensor 102 as coextensive with the second zone of coverage $Z2_1$, as shown in FIG. 6. Additionally, the respective second control modules 138 can demarcate the zones of coverage Zi$_2$ and set the scanning rates of the second radar sensors 136 independently of the first radar sensor 102 and independently of each other, in the same manner as just described for the first radar sensor 102. For a threshold number of objects 104 and above, the second control modules 138 can demarcate the first and second zones of coverage Zi$_2$ of the second radar sensors 136 as null by turning the second radar sensors 136 off, as shown in FIG. 6.

Next, in a block 740, the CHMSL control module 120 receives radar data from the first radar sensor 102. The respective second control modules 138 receive radar data from the respective second radar sensors 136.

Next, in a decision block 745, the CHMSL control module 120 determines whether the data received from the first radar sensor 102 indicates a newly present object 104 in the first zone of coverage Z1$_1$. For example, the CHMSL control module 120 can determine from the data received from the first radar sensor 102 that radio waves in some direction indicate a shorter distance than before, with that distance and direction being inside the first zone of coverage Z1$_1$. The respective second control modules 138 can determine whether the data received from the respective second radar sensors 136 indicate a newly present object 104 in the respective first zones of coverage Z1$_2$. If the data does not indicate a newly present object 104, the process 700 returns to the block 740 to continue monitoring the data from the radar sensors 102, 136 for newly present objects 104. If the data indicates a newly present object 104, the process 700 proceeds to a decision block 750.

In the decision block 750, the CHMSL control module 120 determines whether the newly present object 104 is a recognized person. For example, the CHMSL control module 120 can determine that the newly present object 104 is a recognized person based on a message from the transceiver 134 upon receiving a signal from a key fob of the person. The signal from the key fob indicates that the key fob is within a certain range of the transceiver 134. The identity of the key fob can be stored in memory, and the fact that the key fob matches one stored in memory indicates that the object 104 is a recognized person. In response to recognizing the person, the CHSML control module maintains the scanning rate of the first radar sensor 102 at a default scanning rate, e.g., the baseline rate, and the process 700 returns to the block 740 to continue monitoring the data from the first radar sensor 102 for newly present objects 104. If the object 104 is not a recognized person, i.e., the object 104 is an unrecognized person or a nonperson, the process 700 proceeds to the block 755.

In the block 755, the CHMSL control module 120 adjusts the scanning rate of the first radar sensor 102 based on a distance of the newly present object 104 from the first radar sensor 102. The scanning rate has an inverse relationship with the distance, i.e., the scanning rate increases as the distance decreases. The scanning rate can be chosen for based on how long it would typically take for a person to move the distance, or to move the distance minus a length of the storage area 110. The respective second control modules 138 can adjust the scanning rates of the second radar sensors 136 independently of the first radar sensor 102 and independently of each other, in the same manner as just described for the first radar sensor 102.

Next, in a decision block 760, the CHMSL control module 120 and the second control modules 138 determine whether the data received from the radar sensors 102, 136 indicate the newly present object 104 in any of the second zones of coverage Z2$_j$. For example, the CHMSL control module 120 can determine from the data received from the first radar sensor 102 that radio waves in some direction indicate a shorter distance than before, with that distance and direction being inside the second zone of coverage Z2$_1$. In response to receiving data from the first radar sensor 102 indicating that the newly present object 104 is in one of the first zones of coverage Z1$_j$ and outside the second zones of coverage Z2$_j$, the CHMSL control module 120 refrains from turning on the camera 114, and the process 700 returns to the block 740 to continue monitoring the data from the radar sensor 102, 136 for newly present objects 104. In response to receiving data from the radar sensors 102, 136 indicating that the newly present object 104 is in one of the second zones of coverage Z2$_j$, the process 700 proceeds to a decision block 765.

In the decision block 765, the CHMSL control module 120 or respective second control module 138 determines whether the newly present object 104 moved through the second zone of coverage Z2$_j$ at a speed above a threshold speed. The threshold speed can be chosen to distinguish vehicles driving from people walking or running, e.g., 15 miles per hour. The CHMSL control module 120 or respective second control module 138 can determine the speed v of the newly object 104 by determining a first position (x$_1$, y$_1$) of the newly present object 104 at a first time t$_1$ and a second position (x$_2$, y$_2$) of the newly present object 104 at a second time t$_2$ using the radar data and then divide the distance between the positions by the change in time:

$$v = \frac{\sqrt{(x_2 - x_1)^2 + (y_2 - y_1)^2}}{t_2 - t_1}$$

In response to the newly present object 104 moving through the second zone of coverage Z2$_j$ at a speed v above the threshold speed, the CHMSL control module 120 or respective second control module 138 refrains from turning on the camera 114, and the process 700 returns to the block 740 to continue monitoring the data from the first radar sensor 102 for newly present objects 104. If the newly present object 104 moves through the second zone of coverage Z2$_j$ at a speed below the threshold speed, the process 700 proceeds to a block 770, shown in FIG. 7B.

In the block 770, the CHMSL control module 120 turns on the camera 114, e.g., via an instruction transmitted through the LIN 122.

Next, in a block 775, the CHMSL control module 120 transmits a message instructing at least one vehicle system to wake up. For example, the CHMSL control module 120 transmits a message to the gateway module 128 to wake up the vehicle computer 132, which the gateway module 128 transmits to the vehicle computer 132.

Next, in a block 780, the vehicle computer 132 then records image data from the camera 114. As the vehicle computer 132 records the image data, the vehicle computer 132 overwrites the image data with newer image data from the camera 114. The vehicle computer 132 is thus storing the most recent image data of a preset duration, e.g., 30 seconds. The preset duration can be chosen to be long enough to cover removal of a previously present object 104 from the storage area 110, including time for processing by the CHMSL control module 120 and/or the vehicle computer 132.

Next, in a block 785, the vehicle computer 132 determines whether a previously present object 104 is being removed from within the second zone of coverage Z2$_1$ of the first radar sensor 102 based on the image data from the camera

114. The vehicle computer 132 can identify the situation using conventional image-recognition techniques, e.g., a convolutional neural network programmed to accept images as input and output an identified situation. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential situation, and the final output is the situation with the highest score. The vehicle computer 132 determines that a previously present object 104 is being removed if that situation has the highest score. Upon determining that a previously present object 104 is being removed from within the second zone of coverage $Z2_1$, the process 700 proceeds to a block 790. Upon failing to determine that the object 104 is being removed from within the second zone of coverage $Z2_1$, the process 700 ends.

In the block 790, the vehicle computer 132 stores the image data in memory, such that new image data will not overwrite the image data.

Next, in a block 795, the vehicle computer 132 instructs the transceiver 134 to transmit a message to the remote computing device. The message includes the stored image data from the camera 114. The remote computing device can be, e.g., a mobile device belonging to an owner or operator of the vehicle 100. The owner or operator thus has an opportunity to review the image data from the camera 114 to assess whether something important is occurring in the storage area 110, e.g., the newly present object 104 is a person attempting to remove objects 104 from the storage area 110. After the block 795, the process 700 ends.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive radar data from a first radar sensor and a second radar sensor of a vehicle;
   demarcate a zone of coverage of the first radar sensor, the zone of coverage of the first radar sensor having an area based on a number of objects indicated by the radar data;
   demarcate a zone of coverage of the second radar sensor, the zone of coverage of the second radar sensor having an area based on a number of objects indicated by the radar data from the second radar sensor, the zone of coverage of the second radar sensor being different than the zone of coverage of the first radar sensor;
   after demarcating the zone of coverage of the first radar sensor, in response to detecting a newly present object in the zone of coverage of the first radar sensor, instruct the first radar sensor to adjust a scanning rate of the first radar sensor based on a distance of the newly present object from the first radar sensor; and
   after demarcating the zone of coverage of the second radar sensor, in response to detecting a newly present object in the zone of coverage of the second radar sensor, instruct the second radar sensor to adjust a scanning rate of the second radar sensor based on a distance of the newly present object from the second radar sensor;
   wherein the scanning rate of the second radar sensor is adjusted independently of the scanning rate of the first radar sensor.

2. The computer of claim 1, wherein the area of the zone of coverage of the first radar sensor has an inverse relationship with the number of objects indicated by the radar data.

3. The computer of claim 1, wherein the scanning rate has an inverse relationship with the distance.

4. The computer of claim 1, wherein the zone of coverage of the first radar sensor is a first zone of coverage, the first radar sensor has a second zone of coverage, and the instructions further include instructions to, in response to receiving data from the first radar sensor indicating that the newly present object is in the second zone of coverage, turn on a camera.

5. The computer of claim 4, wherein the camera has a higher power draw than the first radar sensor.

6. The computer of claim 4, wherein the instructions further include instructions to, after turning on the camera, record image data from the camera.

7. The computer of claim 6, wherein the instructions further include instructions to, upon determining that a previously present object is being removed from within the second zone of coverage based on the image data from the camera, store the image data.

8. The computer of claim 7, wherein the instructions further include instructions to, upon failing to determine that the previously present object is being removed from within the second zone of coverage, overwrite the image data with newer image data from the camera.

9. The computer of claim 7, wherein the instructions further include instructions to, upon determining that the previously present object is being removed from within the second zone of coverage based on the image data from the camera, transmit a message including the stored image data to a remote computing device.

10. The computer of claim 4, wherein the instructions include instructions to, in response to receiving the data from the first radar sensor indicating that the newly present object is in the second zone of coverage, transmit a message instructing at least one vehicle system to wake up.

11. The computer of claim 4, wherein the instructions further include instructions to, in response to receiving data from the first radar sensor indicating that the newly present object is moving at a speed greater than a threshold speed, refrain from turning on the camera.

12. The computer of claim 4, wherein the instructions further include instructions to, in response to receiving data from the first radar sensor indicating that the newly present object is in the first zone of coverage and outside the second zone of coverage, refrain from turning on the camera.

13. The computer of claim 4, wherein the instructions further include instructions to, in response to the number of objects indicated by the radar data being greater than a threshold number, demarcate the first zone of coverage coextensive with the second zone of coverage.

14. The computer of claim 1, wherein the instructions further include instructions to, after demarcating the zone of coverage of the first radar sensor, upon determining that the newly present object is a recognized person, instruct the first radar sensor to maintain the scanning rate of the first radar sensor at a default scanning rate.

15. The computer of claim 1, wherein the instructions further include instructions to, in response to receiving data from the first radar sensor indicating a lack of previously present objects in a region, prevent the first radar sensor from running.

16. The computer of claim 1, wherein the instructions further include instructions to, before instructing the first radar sensor to adjust the scanning rate of the first radar sensor, put a wired vehicle network to which the first radar sensor is connected in a low-power state.

17. A method comprising:
receiving radar data from a first radar sensor and a second radar sensor of a vehicle;
demarcating a zone of coverage of the first radar sensor, the zone of coverage of the first radar sensor having an area based on a number of objects indicated by the radar data;
demarcating a zone of coverage of the second radar sensor, the zone of coverage of the second radar sensor having an area based on a number of objects indicated by the radar data from the second radar sensor, the zone of coverage of the second radar sensor being different than the zone of coverage of the first radar sensor;
after demarcating the zone of coverage of the first radar sensor, in response to detecting a newly present object in the zone of coverage of the first radar sensor, instructing the first radar sensor to adjust a scanning rate of the first radar sensor based on a distance of the newly present object from the first radar sensor; and
after demarcating the zone of coverage of the second radar sensor, in response to detecting a newly present object in the zone of coverage of the second radar sensor, instructing the second radar sensor to adjust a scanning rate of the second radar sensor based on a distance of the newly present object from the second radar sensor;
wherein the scanning rate of the second radar sensor is adjusted independently of the scanning rate of the first radar sensor.

18. The method of claim 17, wherein the zone of coverage of the first radar sensor is a first zone of coverage, the first radar sensor has a second zone of coverage, the method further comprising, in response to receiving data from the first radar sensor indicating that the newly present object is in the second zone of coverage, turning on a camera.

* * * * *